United States Patent [19]

Oda et al.

[11] Patent Number: 4,656,653

[45] Date of Patent: Apr. 7, 1987

[54] CORDLESS TELEPHONE APPARATUS HAVING MEANS FOR SYNCHRONIZING CHANNEL SCANNING OF FIXED AND PORTABLE UNITS

[75] Inventors: Toshiaki Oda; Akio Yotsutani, both of Tokyo, Japan

[73] Assignee: NEC Corporation, Tokyo, Japan

[21] Appl. No.: 856,253

[22] Filed: Apr. 28, 1986

[30] Foreign Application Priority Data

Apr. 30, 1985 [JP] Japan .............................. 60-65265[U]

[51] Int. Cl.$^4$ .............................................. H04Q 7/04
[52] U.S. Cl. ...................................... 379/61; 379/58; 379/63
[58] Field of Search .................. 179/2 E, 2 EA, 2 EB, 179/2 EC

[56] References Cited

U.S. PATENT DOCUMENTS

| | | | |
|---|---|---|---|
| 4,458,111 | 7/1984 | Sugihara | 179/2 BC |
| 4,467,140 | 8/1984 | Fathauer et al. | 179/2 EA |
| 4,485,270 | 11/1984 | Honda et al. | 179/2 E |
| 4,535,200 | 8/1985 | Himmelbauer et al. | 179/2 EA |
| 4,558,177 | 12/1985 | Corris et al. | 179/2 EA |
| 4,568,800 | 2/1986 | Orikasa | 179/2 EB |
| 4,574,163 | 3/1986 | Zato | 179/2 EA |
| 4,593,155 | 6/1986 | Hawkins | 179/2 EA |
| 4,595,795 | 6/1986 | Endo | 179/2 EA |

Primary Examiner—Robert G. Lev
Attorney, Agent, or Firm—Sughrue, Mion, Zinn, Macpeak, and Seas

[57] ABSTRACT

According to the invention, there is provided a cordless telephone apparatus having: a fixed unit and a portable unit, each having a control device for channel scanning to determine whether or not each of a plurality of channels is engaged, the portable unit being battery charged when it is attached to the fixed unit; a connecting line for transmitting and receiving signals between the two control devices when the portable unit is attached to the fixed unit; and a system for synchronizing the channel scanning processes of the two control devices through the connecting line.

17 Claims, 8 Drawing Figures

CORDLESS TELEPHONE APPARATUS HAVING MEANS FOR SYNCHRONIZING CHANNEL SCANNING OF FIXED AND PORTABLE UNITS

BACKGROUND OF THE INVENTION

The present invention relates to a cordless telephone apparatus and, more particularly, to a cordless telephone apparatus wherein channel scanning of a portable unit and a fixed unit is improved.

A cordless telephone apparatus, which has neither a centralized control station nor a specific control channel, requires channel scanning to get hold of an idle radio channel. A portable unit and a fixed unit used for the cordless telephone apparatus perform the channel scanning independently of each other. Therefore, the positions of the two units' channels are not correlated to one another. As a result, a considerable length of time is wasted to match the channels of and connect the two units when the portable unit originates or receives a call.

SUMMARY OF THE INVENTION

An object of the present invention, therefore, is to provide a cordless telephone apparatus capable of reducing the time taken to connect the portable and fixed units thereof.

Another object of the invention is to provide a cordless telephone apparatus which synchronizes the channel scanning processes of the two units when the portable unit is attached to the fixed unit in order to charge the battery of the former.

According to the invention, there is provided a cordless telephone apparatus comprising: a fixed unit and a portable unit, each having control means for channel scanning to determine whether or not each of a plurality of channels is engaged, the portable unit being battery charged in a state where it is attached to the fixed unit; a connecting line for transmitting and receiving signals between the two control means in a state where the portable unit is attached to the fixed unit; and means for synchronizing the channel scanning processes of the two control means through the connecting line.

BRIEF DESCRIPTION OF THE DRAWINGS

The above and other objects, features and advantages of the present invention will become more apparent from the detailed description hereunder taken in conjunction with the accompanying drawings, wherein.

DETAILED DESCRIPTION OF THE PREFERRED EMBODIMENTS

Figure 1:
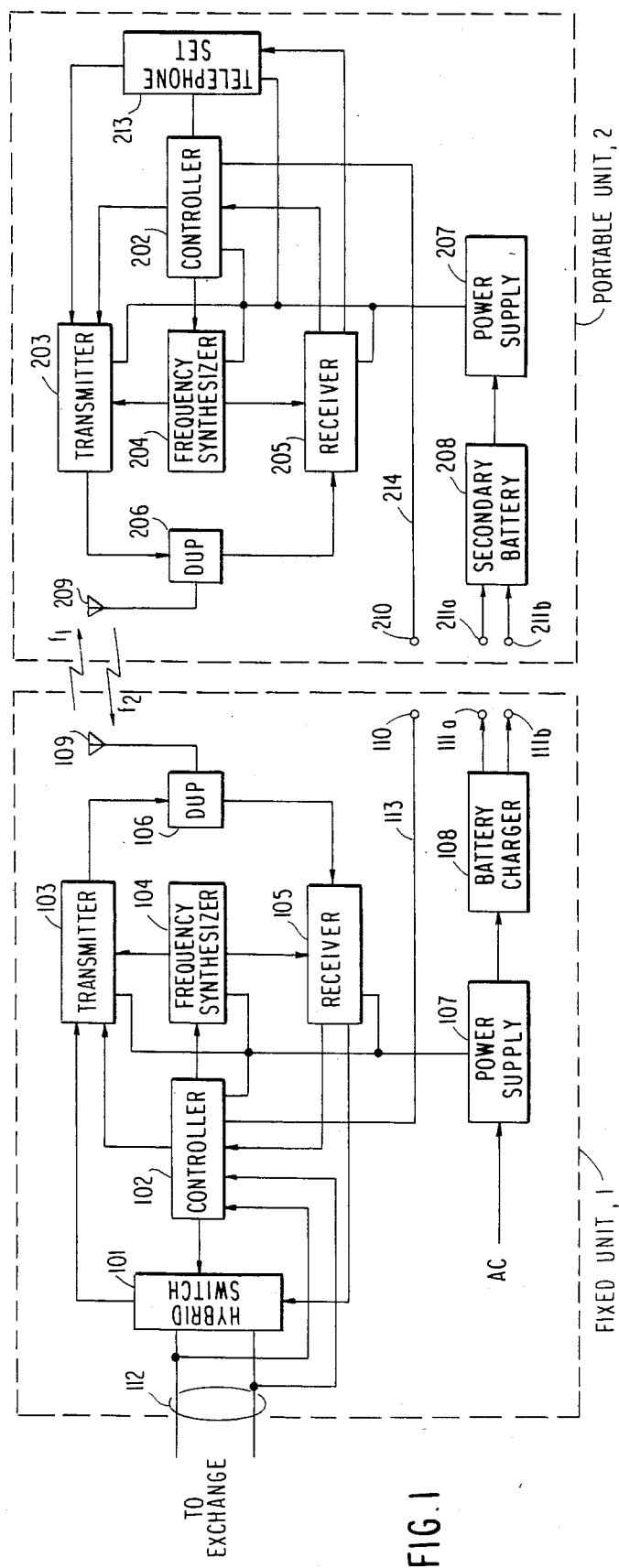
FIG. 1 is a block diagram of a cordless telephone apparatus according to the invention.

Referring to FIG. 1, a fixed unit 1 is connected to an exchange (not shown) through subscriber lines 112. The fixed unit 1 is also connected to a portable unit 2 through wireless channels of radio frequencies f1 and f2. As the radio frequencies f1 and f2 may be respectively used, for instance, from 914.0125 MHz to 914.9875 MHz and from 959.0125 MHz to 959.9875 MHz, permitting the use of 40 channels with a 25 kHz channel spacing. Frequency synthesizers 104 and 204 in the units 1 and 2, respectively, are tuned to one of the 40 channels by control sections 102 and 202. The outputs of the frequency synthesizers 104 and 204 are supplied as local signals to a transmitter section 103 and a receiver section 105 in the fixed unit 1 and a transmitter section 203 and a receiver section 205 in the portable unit 2, respectively to provide a desired channel.

An audio signal from the subscriber lines 112 is supplied through a hybrid switch 101 to the transmitter section 103, to which various control signals from the control section 102 are also supplied. The transmitter section 103, including a frequency modulator for instance, modulates a carrier wave with an input signal, and transmits the modulated carrier wave to the portable unit 2 through a duplexer 106 and an antenna 109. The antenna 109 also picks up a modulated carrier transmitted from the portable unit 2 and supplies it via the duplexer 106 to the receiver section 105. The receiver section 105, which includes a frequency discriminator, demodulates the received carrier wave and supplies the demodulated audio signal to the exchange through the hybrid switch 101 and the subscriber lines 112. Demodulated control signals are supplied to the control section 102.

At the portable unit 2, an audio signal from a telephone set 213, which includes a mouthpiece, an earpiece and a ten-key pad, is supplied to the transmitter section 203, which, including a frequency modulator, modulates a carrier wave with the audio signal and with control signals from the control section 202, and transmits the modulated carrier to the base unit 1 through a duplexer 206 and an antenna 209. The antenna 209 also picks up a modulated carrier transmitted from the fixed unit 1, and supplies it to the receiver section 205 through the duplexer 206. The receiver section 205, which includes a frequency discriminator, demodulates the received carrier wave and supplies the demodulated audio signal to the telephone set 213. Demodulated control signals are supplied to the control section 202.

At the fixed unit 1, the control section 102 detects and processes, with a ringer detector (not shown) therein, an incoming call from the exchange, and also processes an outgoing call from the portable unit 2, provided from the receiver section 105. Similarly, the control section 202 of the portable unit 2 processes both an incoming call provided from the transmitter section 203 and an outgoing call originated from the telephone set 213.

A DC power voltage at the fixed unit 1 is provided from a power supply section 107, which rectifies an AC. A DC power voltage at the portable unit 2 is provided from a power supply section 207, which receives power supply from a secondary or rechargeable battery 208. When the portable unit 2 is attached to the fixed unit 1, charging terminals 111a and 111b, and 211a and 211b are connected to each other, and the secondary battery 208 is charged by a battery charger 108, which receives power supply from the power supply section 107. When the battery is being charged, the controllers 102 and 202 are coupled to each other through control terminals 110 and 210 and connection lines 113 and 214. Through this coupling, the controllers 102 and 202 synchronize their channel scanning, respectively, which will be described later.

Figure 2:
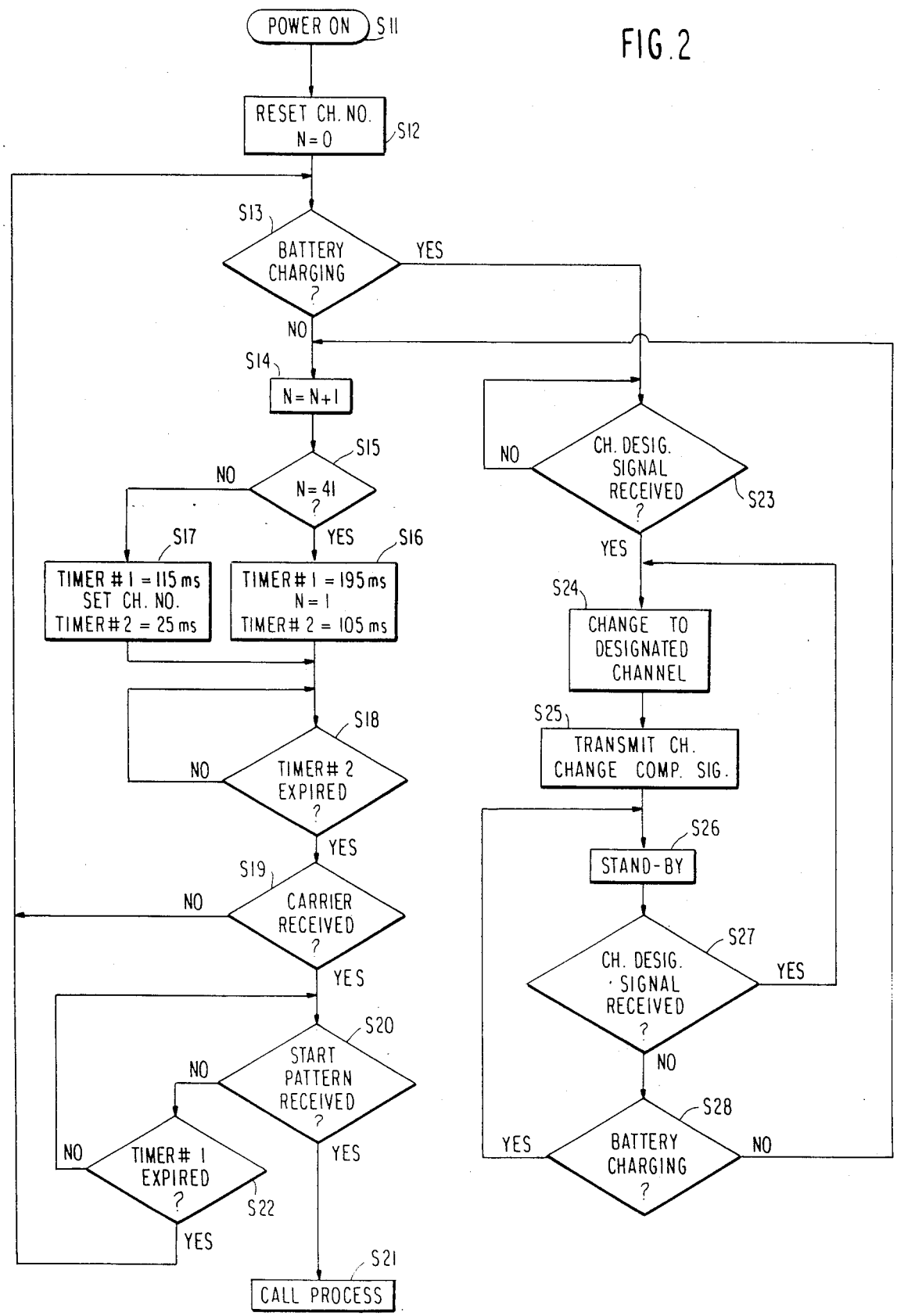
FIG. 2 is a flow chart showing the channel scanning operation of a portable unit upon arrival of a call at the portable unit according to the invention.

FIG. 2 is a flow chart showing how an incoming call is awaited at the portable unit 2 of the preferred embodiment, in which the charging terminals 111a, 111b, 211a and 211b and the control terminals 110 and 210 are exclusively provided. When power is turned on at Step S11, the control section 202 sets the channel number N to zero. Then, it is checked at Step S13 whether or not the portable unit 2 is attached to the fixed unit 1, i.e., whether or not the battery is being charged. If it is not being charged, the channel number N is set to N+1 (Step S14). At Step 15, it is checked whether or not N equals 41, because the apparatus only has 40 channels. The channel number N has to be returned to 1 if it has risen to 41. If N has not yet reached 41, the process advances to Step S17, setting 115 ms on a timer #1, tuning to the set channel by the use of the synthesizer 204, and setting 25 ms on a timer #2.

Meanwhile, if N has reached 41 at Step 15, the process advances to Step S16 to set 195 ms on the timer #1, so control the synthesizer 204 to reduce the channel number to 1 and set 105 ms on the timer #2, The timing intervals of the timer #1 are long enough to determine the presence or absence of a carrier wave in the set channel. Those of the timer #2 are long enough to lock the synthesizer 204, and the intervals at Step 16 are longer because the shift of the channel number from 40 to 1 requires a 1 MHz variation at channel spacings of 25 kHz, resulting in extended duration of the synthesizer locking.

When the timer #2 expires at Step S18, the synthesizer is assumed to be locked, and it is checked whether or not the carrier wave is present on the set channel at the next Step S19 by monitoring the output of the receiver section 205 (FIG. 1). If the carrier wave is detected, the reception of a start pattern which is sent at the beginning of a call is checked at Step S20. Upon reception of the start pattern, incoming call processing is performed at Step S21. Search for the start pattern is continued until the timer #2 expires (Step S22). If no carrier wave is received at Step S19 or the timer #1 has expired, the process returns to Step S13.

If the portable unit is being battery charged at Step S13, it is checked at Step S23 whether or not a channel designation signal has been sent from the fixed unit 1 through the control terminals 110 and 210. Upon reception of the channel designation signal, the channel of the portable unit is switched to the designated channel and, upon completion of this channel switching, a channel change completion signal is sent to the fixed unit 1 to let the apparatus enter into a stand-by state (Steps S24 to S26). Upon reception of another channel designation signal in the stand-by state, Steps S24 to S26 are repeated. If no other channel designation signal is received in the stand-by state, it is checked at Step S28 whether or not battery charging is still continued, and the process returns to Step S26 if it is, or to Step S14 if it is not.

Figure 3:
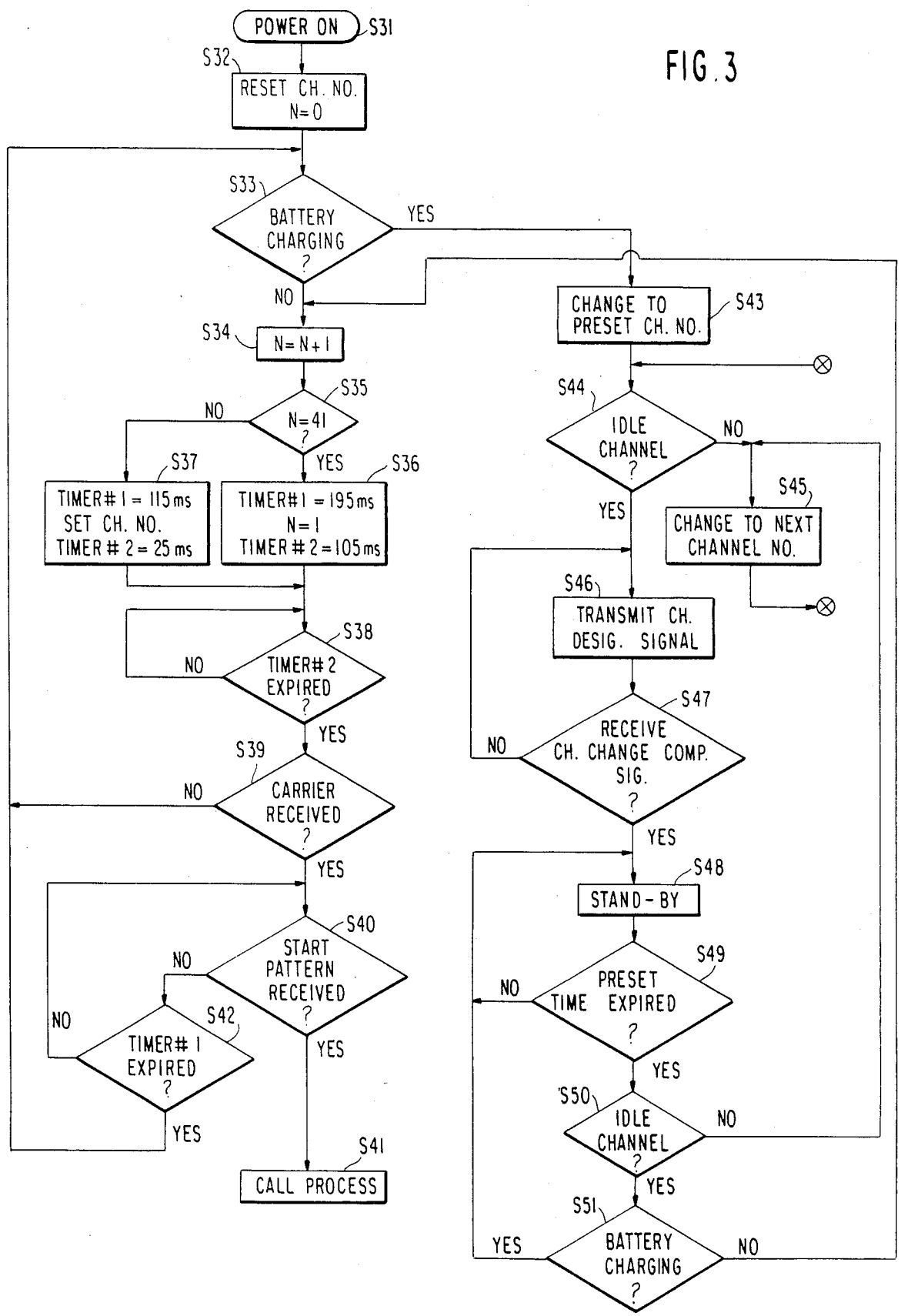
FIG. 3 is a flow chart showing the channel scanning operation of a fixed unit upon origination of a call from the portable unit according to the invention.

FIG. 3 is a flow chart showing a state in which the fixed unit 1 is standing by for a call arrival in the first preferred embodiment. When the power is turned on at Step S31, the channel number N is set to 0 at Step S32. Next at Step S33, it is checked whether or not the battery is being charged and, if it is not, the same actions as at Steps S14 to S22 of the portable unit 2 shown in FIG. 2 are taken at Steps S34 to S42. If the fixed unit is battery charging at Step S33, the process advances to Step S43.

At Step S43, a predetermined channel is selected. It is checked at Step S44 whether or not the selected channel is idle and, if it is not, the next channel is selected at Step S45, followed by similar checking. When an idle channel is eventually found, a channel designation signal representing that channel is sent to the portable unit 2 at Step S46. It is checked at Step S47 whether or not a channel change completion signal from the portable unit 2 has been received and, if it has been, the fixed unit enters into a stand-by state. Since the idle channel may become engaged during the stand-by period, it is checked at Step S49 whether or not a prescribed length of time, for instance 100 ms, has elapsed and, if it has, the channel's ideleness is rechecked. If the channel is found engaged, the process returns to Step S45 or, if it is still idle, it is judged at Step S51 whether or not battery charging is continued. The process returns to Step S48 if it is, or to Step S34 if it is not.

Figure 4:
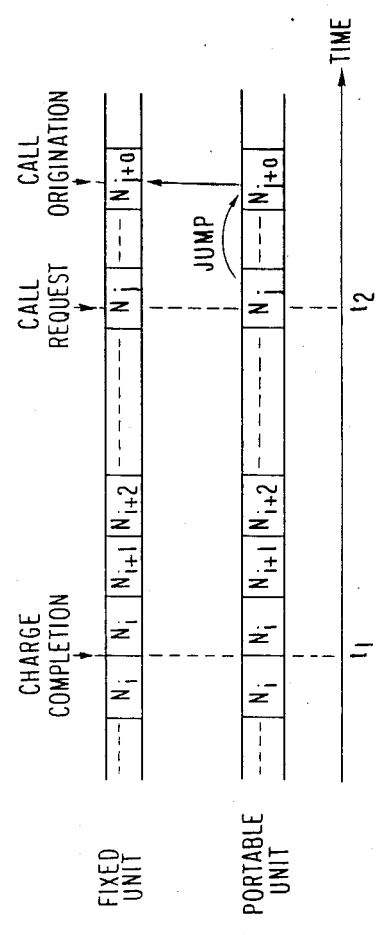
FIG. 4 is a time chart showing the channel scanning operation of the portable and fixed units shown in FIG. 1.

As is apparent from FIGS. 2 and 3, once the portable unit 2 is attached to the fixed unit 1 for battery charging, the channel scanning of the former and that of the latter are synchronized with each other. The connecting procedure to follow the completion of charging will now be described with reference to FIG. 4. It is supposed in FIG. 4 that the portable unit 2 and the fixed unit 1 are set to a channel Ni immediately before the completion of charging. When charging is completed at a point of time t1 and the two units are separated from each other, both units start channel scanning from the channel Ni.

Also suppose that the portable unit 2 originates a call at a point of time t2, and that it is scanning a channel Nj then. After confirming the idleness of the channel Nj, the portable unit 2 sends a call origination signal to the fixed unit 1. Since, at this time, the channel scanning processes of the two units are synchronized with each other, the fixed unit 1 too is on the channel Nj, so that the call origination signal from the portable unit 2 is instantaneously received at the fixed unit 1, whereby the two units are connected. Allowing for a delay in the arrival of the call origination signal at the fixed unit 1 or some lag in the synchronization of channel scanning, a number of channels, for instance three channels, may be skipped to send the call origination signal to a channel Nj+3. At the point of time its channel scanning has reached the channel Nj+3, the fixed unit 1 catches the call origination signal, and a radio channel is established between the two units. In the case of a call arriving at the portable unit 2, i.e., a call originating from the fixed unit 1, exactly the same effect can be achieved, too.

Since the length of time taken to scan a channel is about 140 ms, if the number of channels is 40, the required connection time Tc would average $$Tc = (N/2) \cdot t = (40/2) \times 140 = 2.8 \text{ sec}$$

or be at the maximum $$T_{cmax} = 40 \times 140 = 5.6 \text{ sec}$$

where the channel scanning processes are not synchronized as in the prior art.

According to the present invention, on the other hand, if call origination is performed at a channel ahead of the channel being scanned by five, $$T_c = 5 \times 140 = 0.7 \text{ sec}$$

Thus, the connection time required by the apparatus according to the invention is shorter by 2.1 sec on an average or 4.9 sec at the maximum than that needed by a comparable prior art apparatus.

Figure 5:
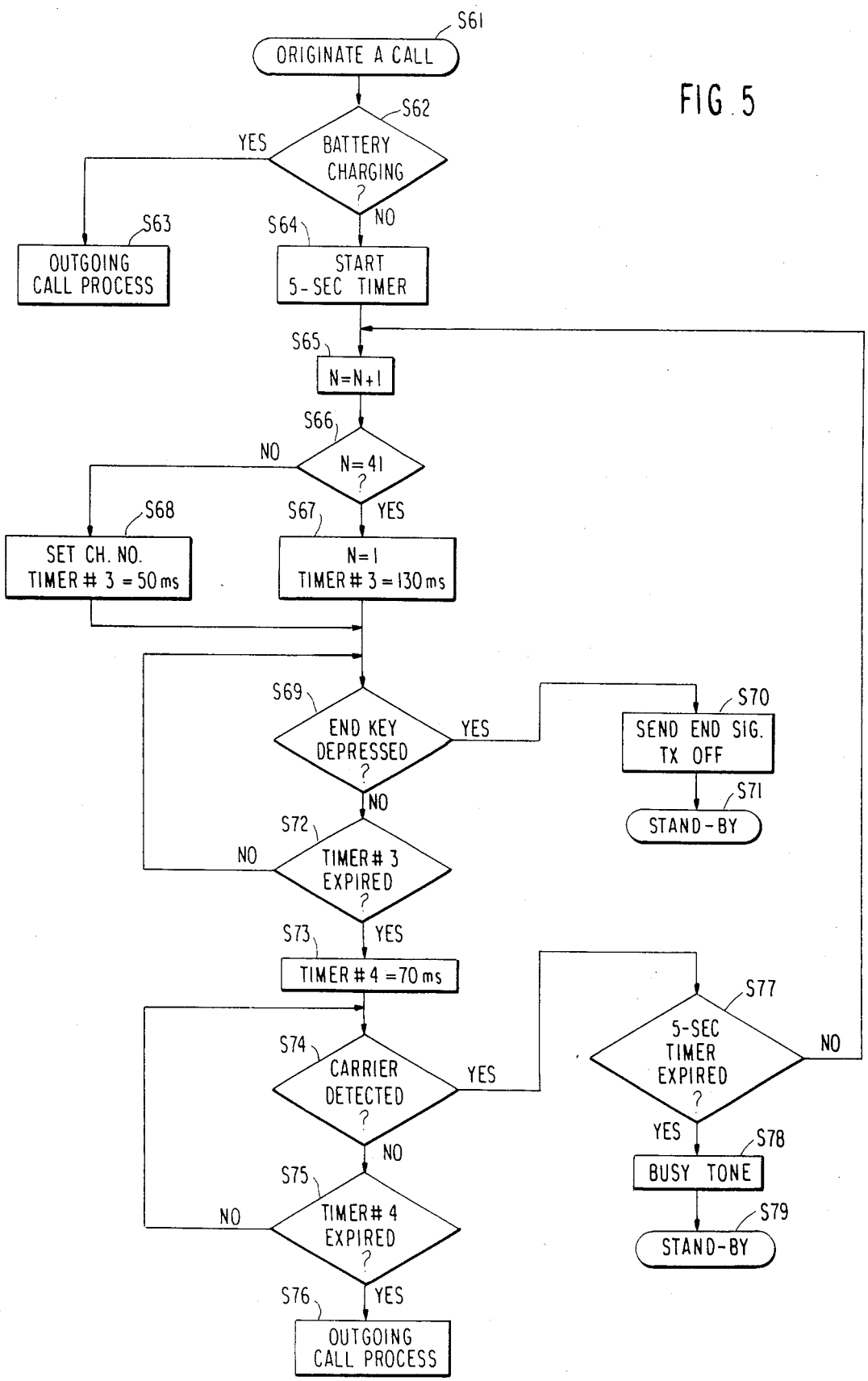
FIG. 5 is a flow chart showing the channel scanning operation of the portable unit upon origination of a call from the portable unit according to the invention.

Next will be described how channels are scanned when a call originates from the portable unit 2 and when one originates from the fixed unit 1 with reference to FIGS. 5 and 6, respectively. Referring to FIG. 5, if a call is originated at Step S64, the portable unit 2 first checks whether or not the battery is being charged. If it is, the portable unit 2 is already standing by with an idle channel as earlier described with reference to FIG. 2, so that it performs outgoing call processing with that idle channel (Step S63). If it is not, it sets a five-second timer at Step S64 and selects N+1 for the channel number N at Step S65. If a number of channels are to be skipped as described with reference to FIG. 4, N+3 or whatever else is appropriate can be selected for N. At Step S66, it is checked whether or not the channel number N that has been set is 41. If it is, N is reduced to 1 or, if it is not, the synthesizer 204 is set to that channel, and 130 ms or 50 ms is respectively set on a timer #3 (Steps S67 and S68). At Step S69, it is monitored whether or not an end key has been depressed, and if it has, an end signal is sent to the fixed unit 1, the transmitter section 203 being turned off and the portable unit returning to a stand-by state. If the end key is not depressed and the timer #3 expires, 70 ms is set on another timer #4 at Step S73. While the timer #4 is counting, the presence or absence of the carrier wave, or the idleness or engagment of the set channel, is determined at Step S74. Unless the carrier wave is detected during the period of the timer #4, the set channel is judged to be idle, and a call is originated on that channel (Steps S74-76). If the channel is judged be be engaged at Step S74, the expiration of the five-second timer is checked at Step S77 and, if it has expired, a busy tone is generated to bring the portable unit back to a stand-by state (Steps S78 and S79). If the five-second timer has not expired, the process goes back to Step S65.

The five-second timer prevents waste of the battery power, because the probability of the presence of an idle channel is higher after the lapse of some time than in continuous searching, and the battery can be saved that much.

Figure 6:
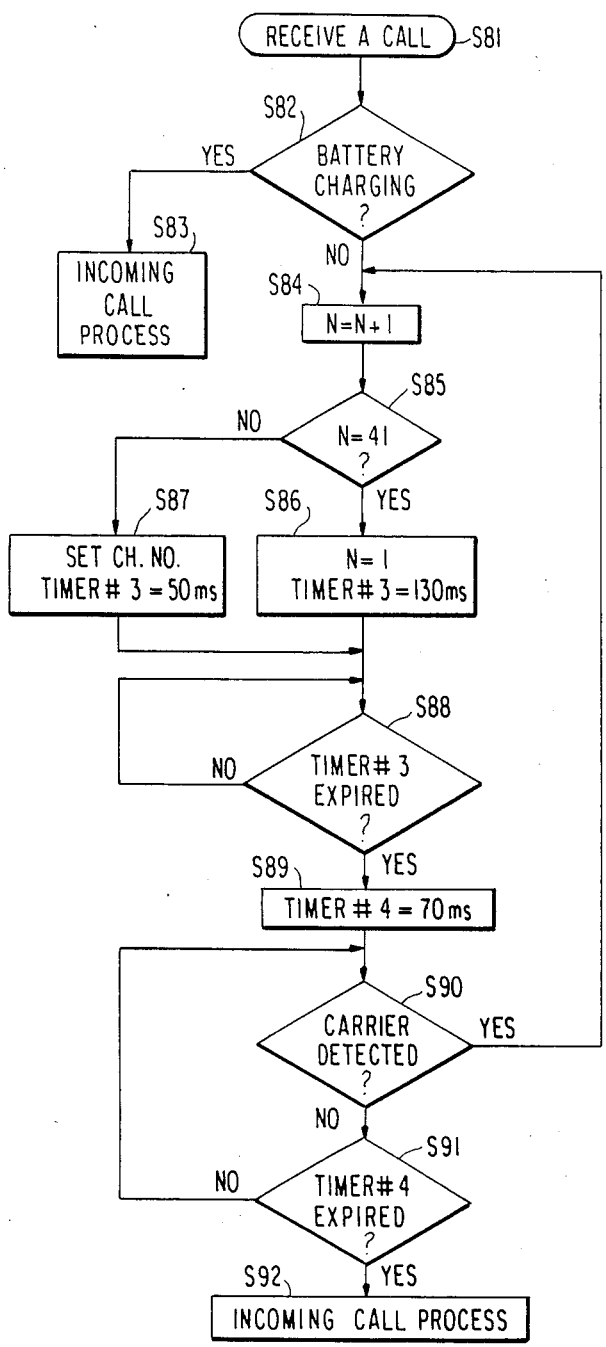
FIG. 6 is a flow chart showing the channel scanning operation of the fixed unit upon arrival of a call at the portable unit according to the invention.

In FIG. 6, call origination at the fixed unit 1, or call arrival at the portable unit 2, is basically the same as call origination at the portabel unit 2 referred to in FIG. 5, except that no five-second timer is used because the fixed unit 1 is connected to an AC outlet and therefore has no need for battery saving. Because of the same operation, no further details will be given. Incoming call processing is termed at Steps S83 and S92 because call origination at the fixed unit 1 corresponds to call arrival at the portable unit 2 from the exchange.

Figure 7:
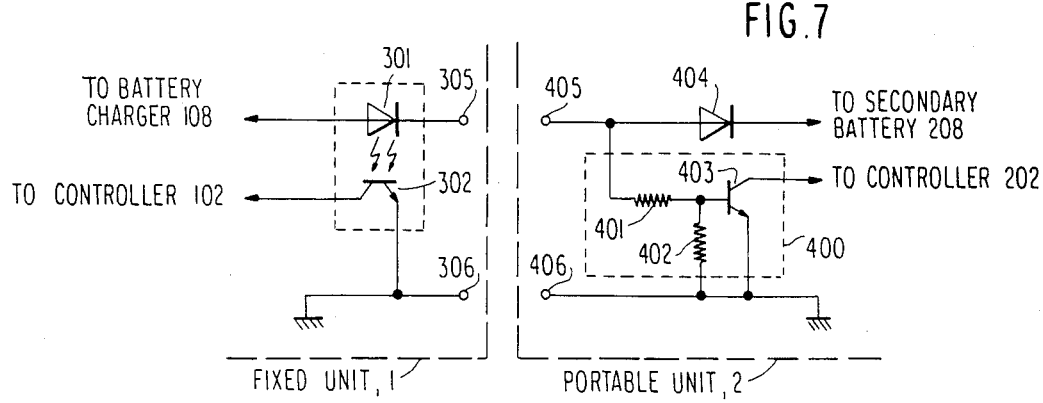
FIG. 7 is a circuit diagram illustrating essential parts of another embodiment of a portable unit and a fixed unit according to the invention.

In FIG. 7, a second preferred embodiment, lacking the control terminals 110 and 210 (FIG. 1), achieves the same effect with battery charging terminals 305, 306, 405 and 406 alone as the first embodiment illustrated in FIG. 1. This arrangement has the advantage of a reduction in the number of external terminals required by the fixed unit 1 and the portable unit 2. At the fixed unit 1, a photosensor 300 is inserted on the way of the connecting line from the battery charger 108 to detect the start of charging and make it known to the control section 102. The photosensor 300 includes a photodiode 301 and a phototransistor 302. At the portable unit 2, a charging voltage detector circuit 400 is inserted on the way of the connecting line from the secondary battery 208 to make the start of charging known to the control section 202. The detector circuit 400 includes resistors 401 and 402 and a transistor 403.

Figure 8:
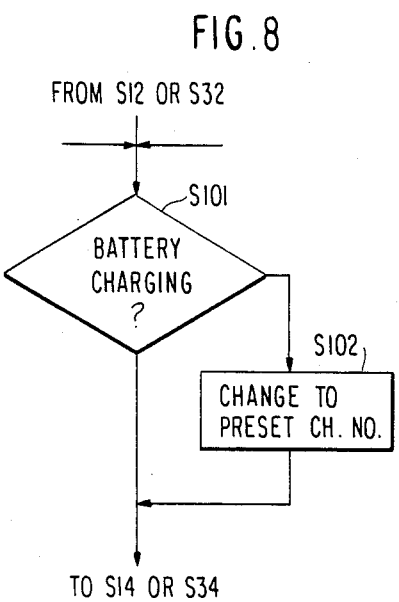
FIG. 8 is a part of a flow chart showing the channel scanning operation of the portable and fixed units shown in FIG. 7.

In the embodiment illustrated in FIG. 7, channel scanning is accomplished as shown in FIG. 8. No operations like Steps S23 to S28 in FIG. 2 or Steps S44 to S51 in FIG. 3 can be taken while the battery is being charged because of the absence of the specialized control terminals 110 and 210. Therefore, upon detection of the battery charging at Step S101, a predetermined channel is selected at Step S102, followed by a shift to Step S14 or S34. However, there still is the effect to synthesize the channel scanning processes of the fixed unit 1 and the portable unit 2. The flow charts of call origination from the portable unit 2 and that from the fixed unit 1 are like those of FIGS. 5 and 6 deprived of Steps S62 to S63 and S82 to S83, respectively.

What is claimed is:

1. A cordless telephone apparatus comprising:
    a fixed unit and a portable unit, each having control means for channel scanning to determine whether or not each of a plurality of channels is engaged, said portable unit being battery-charged in a state where it is attached to said fixed unit;
    a connecting line for transmitting and receiving signals between said two control means in a state where said portable unit is attached to said fixed unit; and
    means for synchronizing the channel scanning processes of said two control means through said connecting line.

2. A cordless telephone apparatus as claimed in claim 1, wherein, if one of said fixed unit and said portable unit originates a call after said portable unit is detached from said fixed unit, the call originating unit originates the call on an idle channel that is being scanned.

3. A cordless telephone apparatus as claimed in claim 1, wherein, if one of said fixed unit and said portable unit originates a call after said portable unit is detached from said fixed unit, the call originating unit originates the call on a channel ahead of the channel that is being scanned by a prescribed number of channels.

4. A cordless telephone apparatus as claimed in claim 2, wherein, said fixed unit includes means for selecting an idle channel out of said plurality of channels; means for sending a channel designation signal representing the selected channel to said portable unit through said connecting line; and means for putting said fixed unit in a stand-by state, after receiving a channel change completion signal, while checking at prescribed intervals whether or not the selected idle channel is still idle, and wherein
    said portable unit includes means responsive to said channel designation signal, that has been received, for switching the channel of said portable unit to the designated channel; means for sending, upon completion of this switching, said channel change completion signal to said fixed unit through said connecting line; and means for putting said portable unit in a stand-by state, after sending out said channel change completion signal, while checking whether or not another channel designation signal has been received.

5. A cordless telephone apparatus comprising:
a fixed unit and a portable unit, each having control means for channel scanning to determine whether or not each of a plurality of channels is engaged, said portable unit being battery-charged from said fixed unit through charging connection lines;
first and second detector means coupled to said charging connecting lines and included in said fixed unit and portable unit, respectively, for detecting the start of the battery charging of said portable unit; and
means responsive to the outputs of said first and second detector means for starting said channel scanning of said fixed unit and portable unit from a predetermined channel.

6. A cordless telephone apparatus as claimed in claim 5, wherein, if one of said fixed unit and said portable unit originates a call, the call originating unit originates the call on an idle channel that is being scanned.

7. A cordless telephone apparatus as claimed in claim 5, wherein, if one said fixed unit and said portable unit originates a call, the call originating unit originates the call on a channel ahead of the channel that is being scanned by a prescribed number of channels.

8. A cordless telephone apparatus as claimed in claim 5, wherein said first detector means includes a photodiode inserted in series on the way of said charging connection lines for sensing the voltage of said charging connection lines and a phototransistor for detecting the output of said photodiode to provide an output as the output of said first detector means, and wherein said second detector means includes a voltage detecting transistor connected in parallel to said charging connection lines for sensing and detecting the voltage of said charging connection lines to provide an output as the output of said second detector means.

9. A method for synchronizing the channel scanning processes of first and second units, comprising the steps of:
(a) scanning in a prescribed order a plurality of channels at said first and second units to check whether or not each of said plurality of channels is idle;
(b) charging the secondary battery of said second unit with power supplied from said first unit;
(c) connecting the control sections of said first and second units with a control line during the charging step of said secondary battery; and
(d) synchronizing the channel scanning of said second unit with that of said first unit through said control line.

10. A method as claimed in claim 9, further comprising the steps of:
(e) selecting an idle channel out of said plurality of channels;
(f) sending a channel designation signal respresenting the selected idle channel from said first to second unit through said control line;
(g) switching the channel of said second unit to said selected idle channel in response to the channel designation signal that has been sent;
(h) sending a channel change completion signal from said first to second unit through said control line in response to the completion of the channel switching of said second unit;
(i) bringing said second unit into a stand-by state after sending out said channel change completion signal;
(j) bringing said first unit into a stand-by state in response to the channel change completion signal that has been sent out; and
(k) repeating said Steps (g) and (i) if another idle channel has been received by said second unit during the stand-by period.

11. A method as claimed in claim 10, further comprising the steps of:
(l) checking, while in the stand-by state, with said first unit at a prescribed interval whether or not said selected idle channel is still idle; and
(m) selecting, if said previously idle channel is engaged, another idle channel and repeating said Steps (f) to (k).

12. A method as claimed in claim 10, wherein, after the charging of said second unit is completed, said first and second units start channel scanning from a channel that is standing by.

13. A method as claimed in claim 10, wherein, if one of said first unit and said second unit originates a call, the call originating unit originates the call on an idle channel that is being scanned.

14. A method as claimed in claim 10, wherein, if one of said first unit and said second unit originates a call, the call originating unit originates the call on a channel adhead of the channel that is being scanned by a prescribed number of channels.

15. A method for synchronizing the channel scanning processes of first and second units comprising the steps of:
scanning in a prescribed order a plurality of channels at said first and second units to check whether or not each of said plurality of channels is idle;
charging the secondary battery of said second unit with power supplied from said first unit;
detecting the start of the charging of said secondary battery at both of said first and second units; and
starting the channel scanning of said first and second units from a predetermined channel in response to the detection of said start.

16. A method as claimed in claim 15, wherein, if one of said first unit and said second unit originates a call, the call originating unit originates the call on an idle channel that is being scanned.

17. A method as claimed in claim 15, wherein, if one of said first unit and said second unit oroginates a call, the call originating unit originates the call on a channel adhead of the channel that is being scanned by a prescribed number of channels.

* * * * *